(12) United States Patent
Stevenson et al.

(10) Patent No.: US 6,769,315 B2
(45) Date of Patent: Aug. 3, 2004

(54) SHACKLE PIN WITH INTERNAL SIGNAL CONDITIONER

(76) Inventors: David L. Stevenson, P.O. Box 190, Gilmer, TX (US) 75644; Larry D. Parsons, P.O. Box 190, Gilmer, TX (US) 75644

(*) Notice: Subject to any disclaimer, the term of this patent is extended or adjusted under 35 U.S.C. 154(b) by 149 days.

(21) Appl. No.: 10/097,154

(22) Filed: Mar. 13, 2002

(65) Prior Publication Data

US 2003/0172740 A1 Sep. 18, 2003

(51) Int. Cl.$^7$ ................................................. G01L 1/04
(52) U.S. Cl. ................................... 73/862.629; 73/794
(58) Field of Search ............................. 73/760, 788, 7, 73/94–797, 802–815, 129–130, 862.629–862.642, 379.01; 116/212

(56) References Cited

U.S. PATENT DOCUMENTS

| | | |
|---|---|---|
| 3,695,096 A | 10/1972 | Kutsay |
| 3,754,610 A | 8/1973 | Paelian et al. |
| 4,042,049 A | 8/1977 | Reichow et al. |
| 4,102,031 A | 7/1978 | Reichow et al. |
| 4,165,637 A | 8/1979 | Kooman |
| 4,215,754 A | 8/1980 | Hagedorn et al. |
| 4,280,363 A | 7/1981 | Johansson |
| 4,429,579 A | 2/1984 | Wilhelm |
| 4,456,084 A | 6/1984 | Miller |
| 4,478,091 A | 10/1984 | Forrester |
| 4,576,053 A | 3/1986 | Hatamura |
| 4,858,475 A | 8/1989 | Jacobson et al. |
| 5,083,624 A | 1/1992 | Reichow |
| 5,167,289 A | 12/1992 | Stevenson |
| 5,230,392 A | 7/1993 | Tremblay |
| 5,327,791 A | 7/1994 | Walker |
| 5,366,033 A | 11/1994 | Koivisto |
| 5,402,689 A | 4/1995 | Grogan |
| 5,410,109 A | 4/1995 | Tarter et al. |
| 5,478,974 A | 12/1995 | O'Dea |
| 5,677,498 A | 10/1997 | Oakes et al. |
| 5,684,254 A | 11/1997 | Nakazaki et al. |
| 5,685,681 A | 11/1997 | Smith, II |
| 5,710,716 A | 1/1998 | Hurst et al. |
| 5,811,738 A | 9/1998 | Boyovich et al. |
| 5,880,409 A | 3/1999 | Hartman |

*Primary Examiner*—Harshad Patel
*Assistant Examiner*—Alandra N. Ellington
(74) *Attorney, Agent, or Firm*—Dennis T. Griggs; Scott T. Griggs

(57) ABSTRACT

A weight measurement method and apparatus for measuring and monitoring the weight load on a vehicle such as a tractor trailer rig. A load pin and bearing assembly mechanically couples the weight of a trailer and its payload to the leaf springs of a tractor trailer truck. The shackle pin is intersected by a longitudinal bore in which multiple strain gage sensors are mounted. A miniature signal processing unit is totally enclosed and shielded within the longitudinal bore and is electrically connected to the strain gage sensors. The signal processing unit develops weight signals that are communicated by conventional low voltage signal cabling to a load display unit in the tractor cab. An offset lubricant passage provides a means for lubricating the load pin bearings while preventing contact of the lubricant with the strain gages, internal wiring and signal conditioner components housed within the main longitudinal bore.

23 Claims, 3 Drawing Sheets

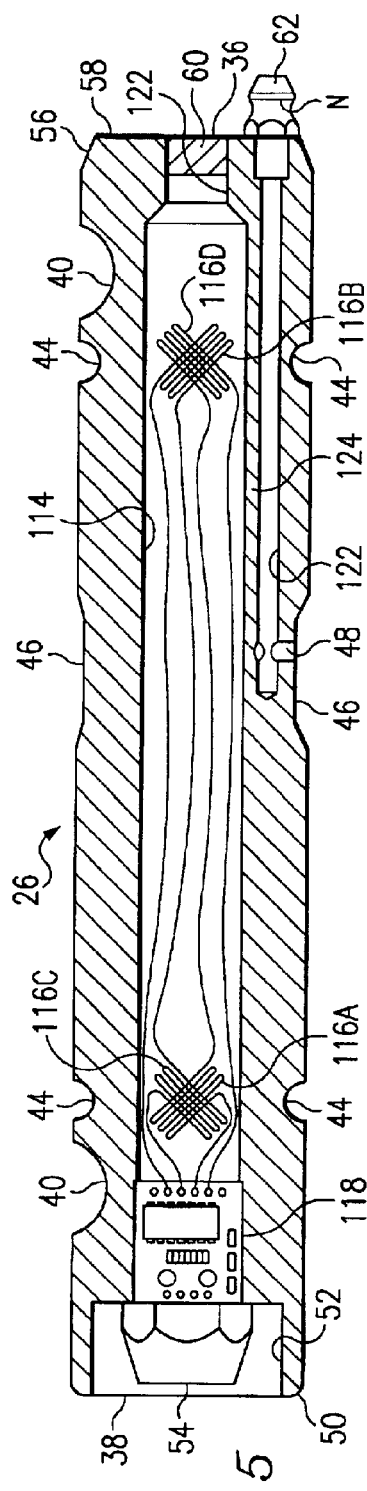
FIG. 5
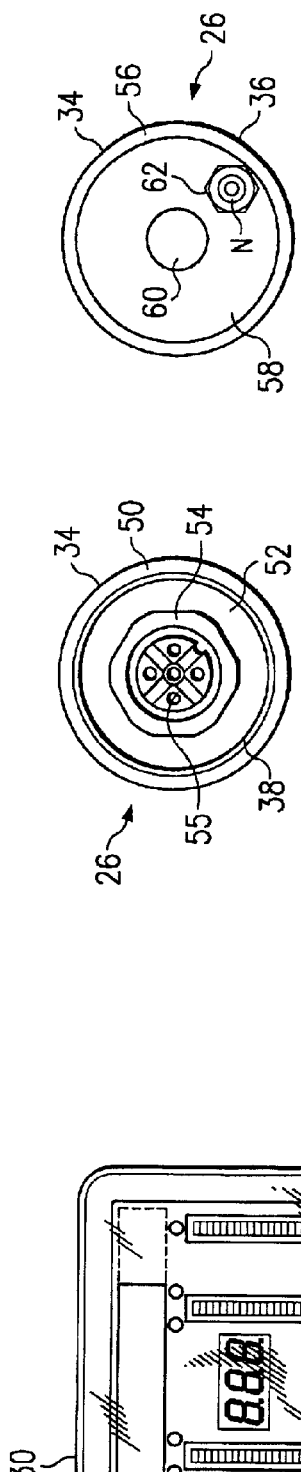
FIG. 6
FIG. 7
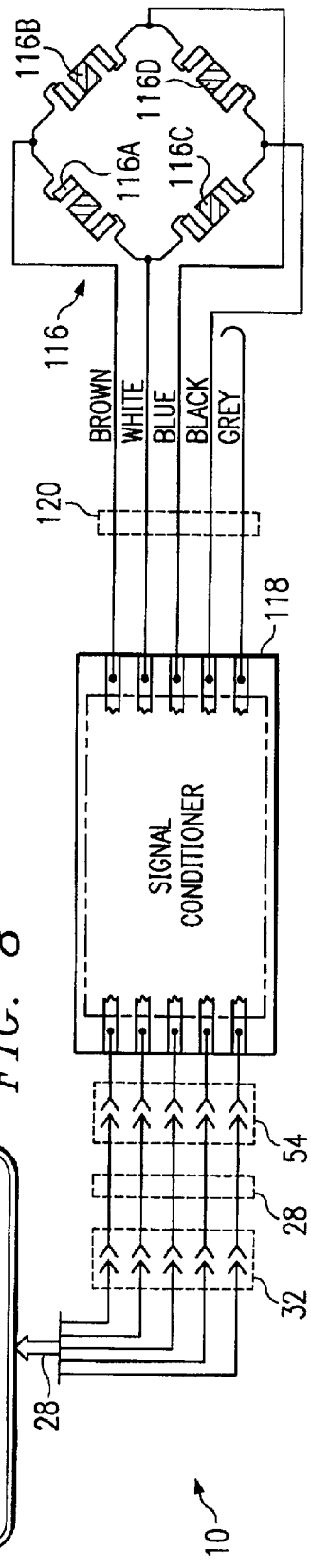
FIG. 8

SHACKLE PIN WITH INTERNAL SIGNAL CONDITIONER

BACKGROUND OF THE INVENTION

This invention relates generally to method and apparatus for monitoring the weight load on a vehicle such as a truck, trailer or the like in which at least one strain gage sensor is internally mounted within a shackle pin that couples a trailer suspension bracket to an axle-mounted leaf spring for on-the-road, real time monitoring of dynamic as well as static load conditions.

Methods for weighing payloads are common on many types of vehicles, such as trucks, vans and other heavy payload vehicles, where weight distribution is an important factor. Operators of trucks driven over interstate highways must monitor the weight of the truck payload for several reasons. Rig operators must remain in compliance with the legal load limits to avoid paying substantial fines levied for weight violations. Also, a driver does not want to carry an excessive load that may damage the trailer, overload the tires and suspension, cause excessive wear on the engine, cause premature wear on the brakes, and reduce fuel efficiency. Additionally, a driver needs to know immediately if the payload has shifted so that he may take emergency measures to restore balance and secure the load before the trailer becomes unstable or unsafe.

Monitoring the payload carried by a tractor trailer can be a difficult task. A payload is often loaded at a remote site such as a gravel pit or logging operation, or other location where truck scales are not readily accessible.

Various devices have previously been used to measure and monitor the weight of a payload. For example, U.S. Pat. No. 5,811,738 (Boyovich et al.) entitled "Trunnion-Mounted Weight Measurement Apparatus" discloses a weight measurement apparatus for determining the weight of a load placed on a wheeled vehicle. The apparatus includes a shackle pin containing strain gages for measuring the stress caused by the load and is connected to the truck by replacing the truck's conventional trunnion coupling with a trunnion member containing the shackle pin and internally mounted strain gages.

U.S. Pat. No. 3,695,096 (Kutsay), entitled "Strain Detecting Cell," discloses a strain load cell combined with a coupling pin or bolt. The body of the coupling pin is intersected by a longitudinal bore and two pairs of strain gages connected in a bridge circuit are mechanically attached to the internal bore sidewall surface. The longitudinal bore also serves as a lubrication passage through which lubrication is supplied to the trunnion bearings. The strain gage signals are routed through an electrical cable to an external processing unit that includes a signal conditioner that amplifies the low level signals and attenuates high frequency noise.

The Kutsay strain detecting cell illustrates certain performance limitations of conventional load measuring systems. The signal processing unit is remotely located from the load pin. Since the strain gage bridge circuit is carefully balanced for outputting a low voltage signal, the impedance of the connecting cable should be adjusted to provide an impedance match with the input of the signal conditioner. Consequently, calibrated cabling or a wireless transmitter/receiver system is required for connecting the strain gage sensor signal to the processor unit. Also, the lubricant present in the passage will contaminate the strain gage components, attacking the adhesive that bonds the sensors to the load pin sidewall. Such interference has been determined to be the cause of improper sensor attachment, producing irregular, distorted output signals.

Other weight measurement devices for transport vehicles are shown in U.S. Pat. No. 3,754,610 (Paelian et al.), entitled "Load Cell"; U.S. Pat. No. 4,102,031 (Reichow et al.), entitled "Method of Installing a Transducer on a Structural Member"; U.S. Pat. No. 5,402,689 (Grogan) entitled "Non-Thread Load Sensing Probe"; and U.S. Pat. No. 5,880,409 (Hartman) entitled "Onboard Weighing System for Truck Having Single Point Suspension."

The data signals generated by a basic measuring device such as a strain gage cell or bridge circuit generally require processing or conditioning before being finally presented to the operator as a load indication. In installations on large vehicles such tractor trailer rigs, the load pin and load sensor circuit are remotely located from the signal conditioning amplifier and data display unit, which are typically installed in the operator cab for on-the-road, real time monitoring of dynamic as well as static load conditions.

Calibrated connecting cables conduct such information to the signal conditioning amplifier, which is usually located in the cab. The cable wiring, which may extend for several feet between the measuring bridge and the conditioning circuit, is subject to inductive pick-up of electromagnetic interference noise generated from various sources that tend to distort the low-level signal output from the measuring bridge, which is typically in the millivolt range. Moreover, the long length of cable wiring introduces unwanted impedances between the bridge circuit and the conditioning amplifier that can degrade the response time and transient overload recovery time of the indicating system.

Conventional strain gage load measuring systems have attempted to overcome these limitations by using a shielded, calibrated cable having a predetermined length and known impedance that is matched with the impedance of the measuring bridge and the conditioning amplifier. However, the calibrated cable is exposed to thermal cycling that causes impedance variations that affect the output of the measuring bridge. Since the cable is calibrated, it is not field-repairable; consequently, a damaged cable must be replaced by a new cable of the appropriate length that has been calibrated to match the particular load sensing circuit and signal conditioner installation on the damaged rig. After cable replacement, the overall system must be audited for accuracy and reliability. Consequently, there is considerable interest in improving such load measuring systems so that rig down-time and maintenance expenses can be reduced, while providing more accurate and reliable load measurements to the rig operator.

BRIEF SUMMARY OF THE INVENTION

The present invention provides improved weight measurement method and apparatus for sensing the weight load on a transport vehicle such as a tractor trailer rig. A load sensing transducer circuit is mounted internally of the load pin or shackle pin and senses the weight load imposed by a trailer and its payload on the leaf springs of the transport vehicle. The load signal produced by the transducer circuit is fed directly into the input of a signal conditioning processor that is also mounted internally of the shackle pin. The conditioned load signal is then transmitted via conventional non-calibrated low voltage signal cabling to a remote data display unit that can be monitored by the truck operator.

The body of the shackle pin is intersected by a longitudinal bore in which multiple strain gage sensors are mounted. A miniature signal processing unit includes a signal conditioner that is totally enclosed within the longitudinal bore and shielded by the metallic body of the surrounding load pin. The strain gage sensors are mechanically bonded by adhesive deposits to the internal bore sidewall of the load pin and are electrically coupled together and to the signal conditioner by internal wiring that is totally shielded by the metallic body of the load pin.

The strain gages develop a signal proportional to the weight of the trailer load for input to the signal conditioner. The load forces imposed on the shackle pin are amplified and filtered by the internal signal conditioner and are sent to the data display unit to calculate the total load borne by each wheel or axle. Preferably, the signal conditioner sends this data via conventional, non-calibrated low voltage signal cabling to a controller and display unit installed in the cab of the transport vehicle for real time monitoring by the rig operator.

The load pin is intersected by a radially offset, longitudinal bore forming an internal lubrication passageway that is isolated with respect to the longitudinal bore in which the strain gage sensors and signal processing unit are mounted. The internal lubrication passageway provides lubrication to a set of bearings located in a suspension bracket that couples the shackle pin and a leaf spring assembly to the trailer frame.

The radially offset lubrication passage is isolated from the longitudinal bore and the electronic signal conditioning components within the bore. Since the strain gages are bonded onto the internal bore sidewall of the pin by adhesive deposits, those deposits are vulnerable to attack by hydrocarbon compounds present in conventional lubrication grease. The offset lubricant passage provides a means for lubricating the bearings while preventing contact of the lubricant with the strain gages, internal wiring and signal conditioner components housed within the main longitudinal bore.

Since the lubrication passage is isolated from the main longitudinal bore passage, the lubrication passage can be pressurized with lubricant without pressurizing the electronic components within the main bore. Otherwise, the signal conditioner, strain gages and internal wiring would be exposed to high impulse lubrication pressure surges that could damage the components or possibly cause a discontinuity in the internal strain gage wiring as a result of bearing lubrication service operations performed during normal periodic maintenance of the vehicle.

The signal conditioner is internally mounted in the load pin and is closely coupled to the internally mounted strain gage sensing circuit by short, internal wiring conductors. Thus there is no need for a calibrated cable or radio transmission device to send the conditioned load sensor signals to the remote data display unit. Conventional, non-calibrated low voltage data transmission conductors are used to connect the conditioned output signals to the remote data display unit. Since there is no requirement for calibration or impedance matching, a damaged signal cable can be quickly repaired or replaced in the field with conventional low voltage signal cabling without significant rig down-time. Morever, different tractors can be attached to the trailer and operated with the installed load sensors and existing display equipment without calibration.

Moreover, because impedance matching is not a limiting factor in the present load pin installation, signal delay and distortion are eliminated, thus overcoming a major limitation of conventional strain gage measuring systems that use calibrated cables. Because the load signals are preconditioned at the load pin, signal distortion, noise and impedance problems are avoided. The load monitoring system of the present invention responds immediately and accurately to transient load conditions. Therefore there is no lag time or load signal distortion experienced when measuring and indicating the weight of the load. Thus, it is possible to reliably sense gradual as well as rapid shifting overload conditions as they develop, thus providing an early warning of an impending dangerous load condition, allowing the operator to stop the transport vehicle and balance the load or take other corrective action at the onset of a load problem, before the trailer becomes unstable.

BRIEF DESCRIPTION OF THE DRAWING

The accompanying drawing is incorporated into and forms apart of the specification to illustrate the preferred embodiments of the present invention. Various advantages and features of the invention will be understood from the following detailed description taken in connection with the appended claims and with reference to the attached drawing figures in which:

FIG. 5 is a side sectional view of the load pin installation showing the load pin with a strain gage sensor circuit and a signal conditioner, both internally mounted within a longitudinally extending main bore passage, and a radially offset lubrication passage that is isolated from the main bore passage.

FIG. 6 is a front elevation view of the load pin of the present invention, showing a cable connector disposed in the main bore passage of the load pin.

FIG. 7 is a rear elevation view of the load pin of the present invention, showing a lubrication fitting disposed in the radially offset lubrication passage of the load pin.

FIG. 8 is an electrical schematic diagram illustrating the electrical interconnection of the load sensor circuit, signal conditioner and data display unit of the invention.

DETAILED DESCRIPTION OF THE INVENTION

Figure 1:
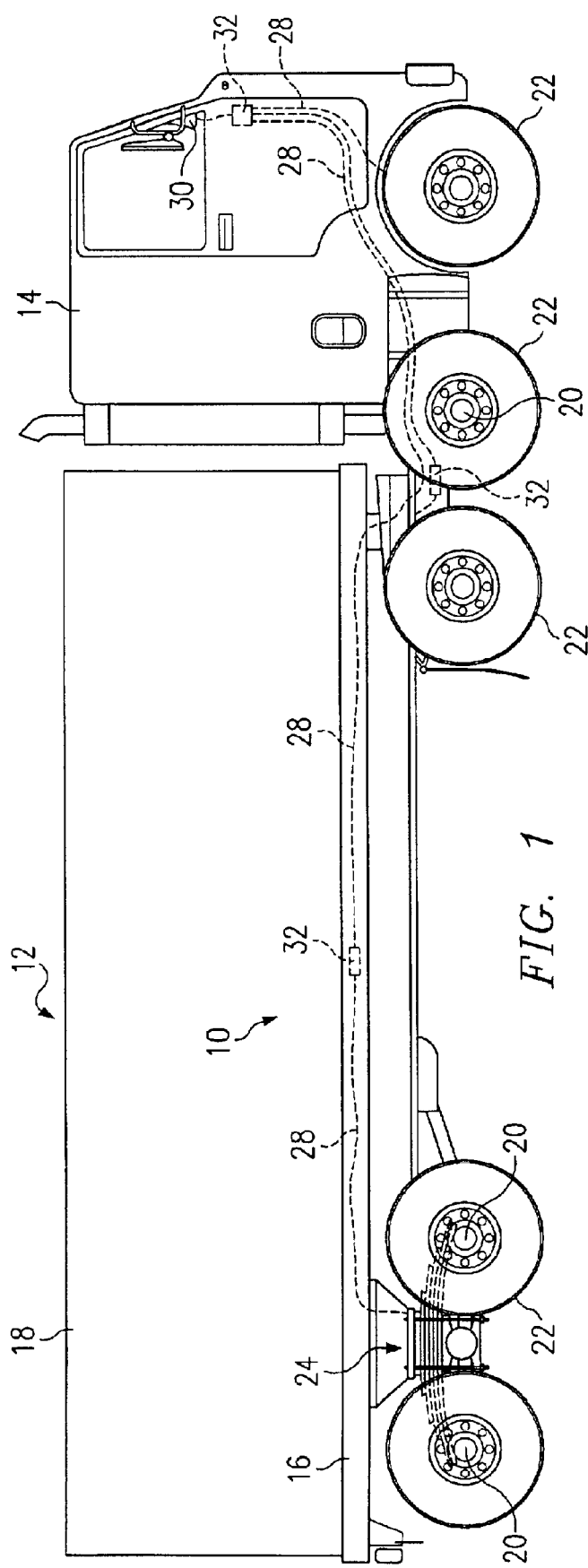
FIG. 1 is a side elevation view of a tractor trailer transport rig including a cab, a tractor and a trailer on which the weight measurement apparatus of the present invention is mounted.

Preferred embodiments of the invention will now be described with reference to various examples of how the invention can best be made and used. Like reference numerals are used throughout the description and several views of the drawing to indicate like or corresponding parts.

Turning now to the drawing, and more specifically to FIG. 1, the weight sensing apparatus 10 of the present invention is shown by way of example installed on a conventional tractor trailer rig 12. The weight measurement apparatus 10 could be installed the load bearing coupling structure of any wheeled or tracked vehicle such as a crane, dump truck, excavator, drag line, fork lift, caterpillar, aircraft or the like. It can also be used to good advantage in connection with fixed load lifting equipment used in various heavy industrial operations and manufacturing processes where load balancing is essential.

Figure 2:
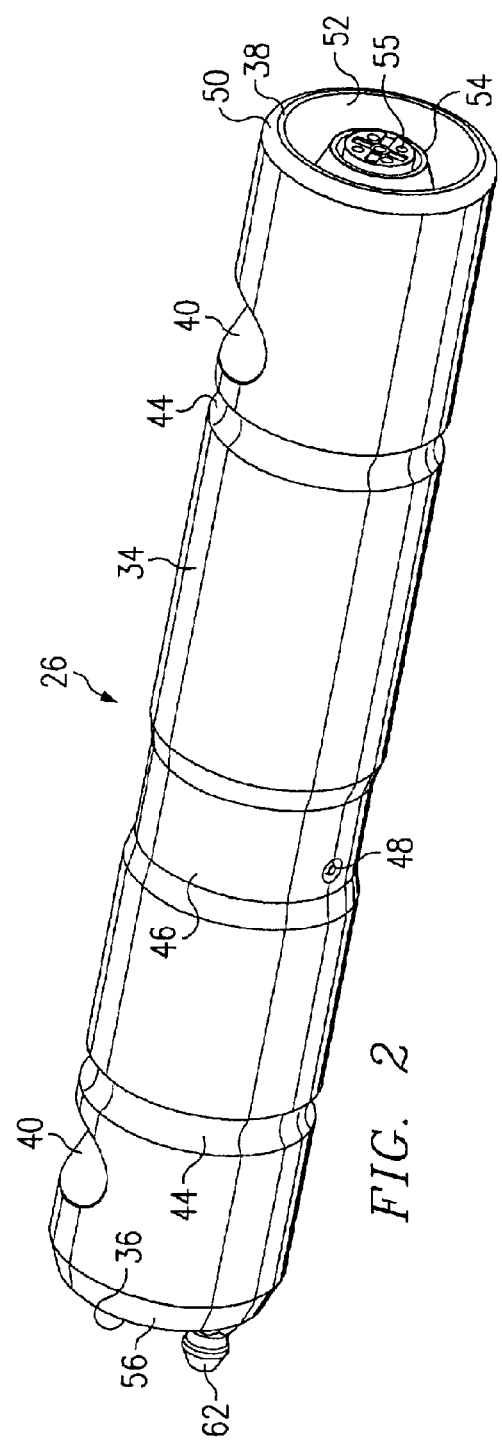
FIG. 2 is a perspective view of a load pin of the present invention having strain gage sensors and a signal processing unit mounted internally therein.

The tractor trailer 12 has an operator cab 14 mounted on a tractor that pulls a trailer 16 and a payload or load 18. The trailer 16 has multiple axles 20 and wheels 22 mounted to the trailer 16 by multiple leaf spring suspension members 24. A shackle pin 26 as shown in FIG. 2, also referred to as a load pin herein, senses the weight of the trailer 16 and its payload 18 on the axles 20. A low voltage electrical signal cable 28 routes the load signals to a data display unit 30 in the tractor cab 14. One or more cable connectors 32 serially connect multiple wiring conductors of the cable 28 from the load pin to the tractor cab 14.

Referring now to FIG. 2, the load pin or shackle pin 26 of the present invention is shown in perspective view. The shackle pin 26 is formed from an elongated section of rod selected for its mechanical properties. Preferably, the shackle pin 26 is composed of steel. The shackle pin 26 has a generally cylindrical outer surface 34 with a lubrication end 36 and a signal connector end 38.

Figures 3, 4:
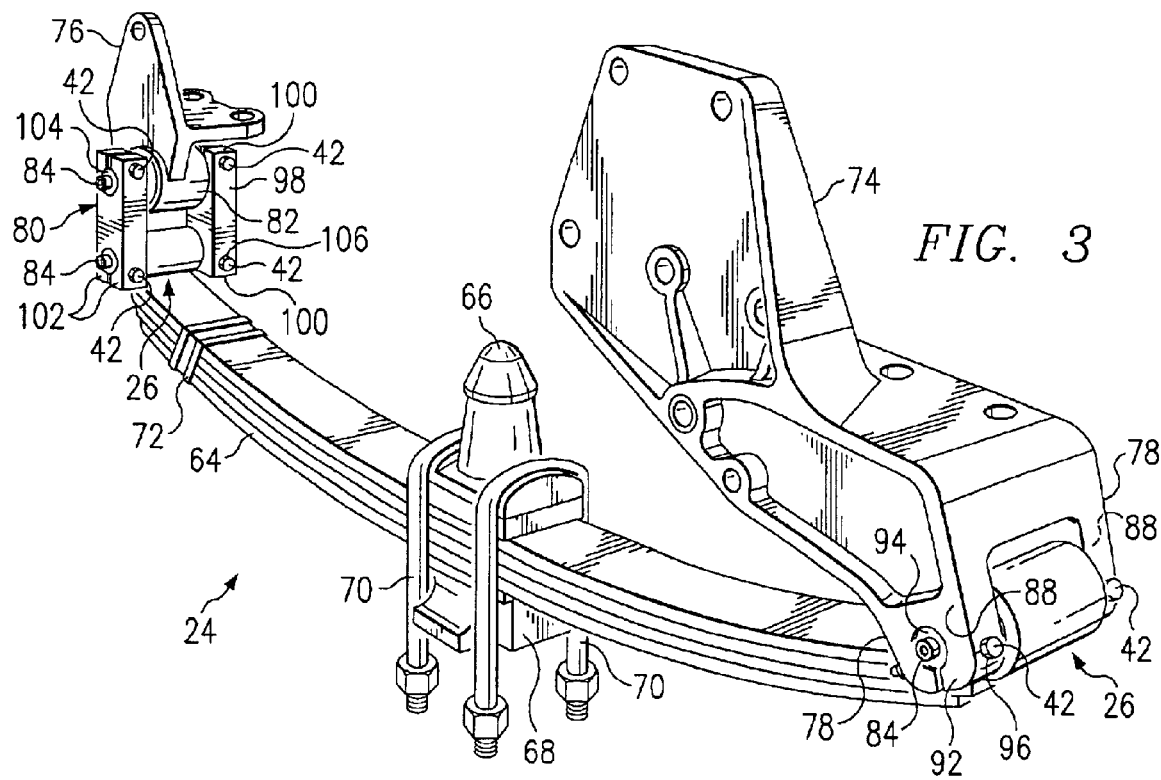
FIG. 3 is a perspective view of the load pin of the present invention installed in a shackle coupling bracket of a leaf spring suspension member.
FIG. 4 is a side elevation view, partly in section, of the load pin installation of FIG. 3.

Two bolt alignment notches 40 are formed in the outer surface 34 to position two bolts 42, as shown in FIG. 3 and FIG. 4, for securing the shackle pin 26 to the suspension member 24. Two intermediate hysteresis grooves 44 are formed in the outer surface 34 of the shackle pin 26. The hysteresis grooves 44 are formed in a manner to concentrate the shear forces experienced by the shackle pin 26 at predetermined internal load sensing positions where strain gage sensors are located.

An annular channel or lubrication groove 46 is formed in the outer surface 34 of the shackle pin 26. A lubricant, preferably grease, exits the shackle pin 26 through a grease port 48 and flows into and around the lubrication groove 46.

A first collar 50 is disposed between the outer surface 34 and the connector end 38. An annulus 52 is formed between the collar 50 and a female cable connector 54. The connector 54 includes multiple female sockets 55 for receiving male pins of a mating signal connector for making external electrical connections to a signal conditioner enclosed within the shackle pin 26.

A second collar 56 is positioned between the outer surface 34 and the lubrication end 36. An end plate 58 is formed between the collar 56 and a plug or cover plate 60 and a lubrication fitting 62, preferably a one-way check valve commonly known as a zert fitting. The cover plate 60 and the zert fitting 62 are physically separated from one another by the end plate 58.

Preferably, the shackle pin 26 is constructed of schedule E4340 steel per AMS-2301 with a heat treated and hardened case. The shackle pin is preferably rated at a load capacity of 5,000 pounds and can accommodate overloads of 300% without damage and overloads of 500% without structural failure.

Referring now to FIG. 3, a suspension member 24 with leaf springs 64 is shown in perspective view. A suspension member 24 utilizing leaf springs 64 is a common form of suspension system. Leaf spring suspension systems can be used on any vehicle, such as a truck, van or other heavy payload vehicle, where sensitivity to mechanical vibration is an important factor. Leaf springs 64 resiliently support the trailer relative to the axle and carry loads on the axle 20 and aft to frame-mounted supporting devices. The leaf spring 64 of FIG. 3, is by way of example, designed for use on the tractor trailer rig 12.

In a large vehicle that includes two or more axles 20, such as the tractor trailer rig 12, the central portion of the series of leaf springs 64 is secured to the trailer 16 by a trunnion shaft 66 mounted to a trunnion bracket 68 by two U-shaped bolts 70. Additionally, a clamp secures the leaf springs together.

The leaf springs 64 are pivotally connected at one end to a front bracket 74 in a manner such that the leaf spring 64 is connected at another end to a rear bracket 76. Preferably, the connection at the rear bracket 76 of the suspension member 24 has a double rotatable configuration, that is, two parallel axes of rotation. The double rotatable configuration aids in preventing buckling of the leaf spring 64. Buckling of the leaf spring 64 results from the axle 20 moving relative to the trailer 16 as the leaf spring 64 deflects due to changes in its horizontal length.

Two front bracket links or front bracket shackles 78 are attached at their top ends to the front bracket 74 and are pivotally attached at their bottom ends to the leaf springs 64.

Similarly, two rear bracket links or rear bracket shackles 80 are pivotally attached at their top ends to the rear bracket 76 and are pivotally attached at their bottom ends to the leaf springs 64. In this manner, the leaf spring assembly is still pivotally attached to the axle, but also may still move in the fore and aft directions relative to the frame of the vehicle to help prevent buckling of the leaf springs 64.

The leaf springs 64 are secured to both the front bracket shackles 78 and the rear bracket shackles 80 with shackle pins 82 and shackle pins 26 of the present invention. A system of caps and pinch bolts 84 secure the shackle pins 82 and 26 to the front bracket shackles 78 and rear bracket shackles 80. In particular, the front end of a leaf spring assembly 64 is pivotally connected to the front bracket 74 using a shackle pin 26 rotatably attached to the front end of the leaf spring 64 and to the front bracket 74. The shackle pin 26 is secured in place using a fitted cap 84 that is attached to one end of the shackle pin 26 such that lateral movement of the shackle pin 26 relative to the leaf spring 64 and the front bracket 74 is prevented.

The rear end of the leaf spring assembly 64 is connected in a double rotatable configuration to the rear bracket 80 using two shackle pins 82 and 26, two shackles 80, four pinch bolts and four caps 84. One shackle pin 26 is rotatably attached to the rear end of the leaf spring 64 and one shackle pin 26 is rotatably attached to the rear bracket 76.

Referring now to FIG. 3 and FIG. 4, as previously described, each shackle pin 26 in the cap and pinch bolt mounting apparatus 84 has one semi-circular bolt alignment notch 40 near each end of the shackle pin 26, wherein the axis of each bolt alignment notch 40 is substantially perpendicular to the longitudinal axis of the shackle pin 26.

Two front bracket shackles 78 are used to link one end of the shackle pin 26 to the corresponding end of the shackle pin 26. Each front bracket shackle 78 has a central body portion 88 and end 90; each end 90 includes a pair of arms 92 forming a cradle for holding a bushing 94. The arms 92 do not contact each other when fully engaged around the bushing 94, thus allowing adjustment of the compression force applied to the bushing.

Each end of the shackle is intersected by a bolt hole 96 passing through both arms in a direction perpendicular to the cradle. The diameter of the cradle is adjusted by tightening a threaded bolt 42 that passes through the bolt holes 96 in the arms 92. Additionally, the bolt hole 96 is oriented such that a bolt 42 passing through the cradle arms 92 partially enters the cradle space enclosed by the arms 92.

Similarly, two rear bracket shackles 80 also support link one end of the shackle pin 26. Each rear bracket shackle 80 has a central body portion 98 and two ends 100; each end comprises two arms 102 forming a cradle 104. The arms 102 do not completely close when fully engaged around the bushing 94, so that the compression force applied to the bushing can be adjusted during installation and replacement.

Each end 100 of the shackle 80 also has a bolt hole 106 passing through both arms 102 in a direction perpendicular to the cradle 104 such that the diameter of the cradle can be reduced, as described above.

When assembled, the shackle pin 26 is aligned through the cradle such that a bolt 42 threaded through the bolt hole 106 in the arms 102 of the shackle 80 is aligned with the bolt alignment notch 40 near the end of the shackle pin 26, and the bolt 42 is tightened to form an interface between the shackle pin 26 and the shackle 80.

In this manner, the shackle pin 26 is prevented from rotating relative to the shackle 80 and is prevented from moving laterally relative to the shackle 80. Finally, a cap 84 is placed on the end of each shackle pin 26 to further secure the shackle pin 26 in place.

The shackle pin 26 of the present invention can be inserted into any bracket of any suspension member. For example, the shackle pin can be placed in the rear wheel suspension members 24 of the trailer, as shown in FIG. 1, the front wheel suspension members of the trailer (not shown), or on any of the suspension members of the tractor cab (not shown).

Referring now to FIG. 4, the shackle pin 26 of the present invention is fitted into the front shackle bracket 78 that is fixed to the leaf springs 64 and trunnion shaft 66 that is projecting externally from the trunnion bracket 68. The front shackle bracket 78 is being described by way of example. Similarly, the shackle pin 26 could be installed in the rear shackle bracket 80.

The bushing 94, in the form of a hollow cylindrical sleeve, is compressed and held securely by the cradle arms 92 of each bracket 78, thus forming an annulus 95 around the shackle pin 26. Needle roller bearings 108 are retained in the annulus 95 between the shackle pin and the bushing 94 and engage the shackle pin 26 on the outer cylindrical surface 34 between the external grease groove 46 and the hysteresis grooves 44.

Each bushing 94 is approximately 4.00 inches long and has outside diameter of approximately 2.00 inches and inside diameter of approximately 1.30 inches. The size of the bushing 94 varies in length and diameter according to the equipment specifications of various trucks and manufacturers. The dimensions given here are typical.

The inner and outer surfaces of the bushing 94 are precisely machined and highly polished. Both surfaces are machined to a 63 to 125 micron standard scale smooth finish. All surfaces for bearing contact are machined to a roundness tolerance of 0.0030 inch.

For aligning and retaining engagement with the shackle pin 26 and retaining bolts 42, the shackle pin 26 has bolt alignment notches 40 whose principal surfaces are polished to the same degree as the other bearing contact surfaces. Herein, it is polished to a 63 to 125 micron standard scale finish and is machined to a roundness tolerance of 0.005 inches to provide a very smooth and round surface.

The needle bearings 108 are disposed on opposite ends of the bushing 94 so as to equally transmit the loading from the leaf springs 64 to the shackle pin 26. Preferably, the bearings 108 are separated by a cylindrical spacer 110 that is made of bearing steel. However, the spacer 110 could be made of any material sufficiently rigid to maintain the bearings in their proper positions that also has a thermal expansion coefficient sufficiently close to that of bearing steel so as not to induce binding or warping of the bearings during thermal expansion and contraction.

As will be appreciated by one having ordinary skill in the art, any method for assuring proper longitudinal alignment of the bearings 108 that does not create thermal expansion or contraction problems is acceptable.

In the preferred embodiment, all relative motion within the bushing 94 occurs at the bearing 108 and shackle bracket 78 interface and bearing 108 and shackle pin interface 26. This prevents the cable 28 from becoming twisted or damaged.

In keeping with the design criterion of the present invention the bearings 108 are preferably press fitted into the bushing 94. In the preferred embodiment, the bearing assemblies 108 are maintained in their positions abutting the spacer 110 or other separating device by a permanent adhesive which bonds the bearing races to the bearing housing inner surface. Other types of retaining devices, such as lock-rings, may be used instead.

The precision grinding and smooth surfaces on the shackle pin 26 are chosen such that the spacing between the bearings 108 and the outer pin bearing surface 34 does not exceed 0.002 inch so that there is not a large gap or space to cause a vertical pounding of the bearing elements along rough roads.

The dimensions of the cylindrical bushing 94 are selected to yield an inside diameter substantially larger than the shackle pin diameter to provide an annular reservoir space 112 between the annular grease groove 46 and the bushing 94 to hold grease or lubricant.

Referring now to FIG. 5, the shackle pin 26 is intersected along its length by a longitudinal main bore 114. Installed within the longitudinal bore is a strain gage bridge circuit 116 and a signal conditioner 118. The bridge circuit 116 includes four strain gages 116A, 116B, 116C and 116D, or other sensor transducer devices connected in a conventional Wheatstone bridge arrangement.

Referring to FIG. 5, FIG. 6 and FIG. 7, the main bore 114 extends longitudinally from the connector end 38 of the shackle pin 26 to the lubrication end 36 of the shackle pin 26. The cable connector 54 is positioned at the junction of the longitudinal bore 114 and the connector end 38 and the cover plate 60 seals the main bore 114 at the junction of the longitudinal bore 114 and the lubrication end 36.

Referring again to FIG. 5, the strain gage bridge circuit 116 is arranged in longitudinally spaced pairs of stain gages 116A, 116C and 116B, 116D preferably placed in close alignment with the hysteresis grooves 44. The hysteresis grooves 44 are positioned and configured to concentrate the shear forces experienced by the load pin 26. Preferably, the strain gages of each bridge pair 116A, 116C and 116B, 116D are stacked overlapping one another and are bonded to the bore sidewall surface 114 in proximate alignment with the hysteresis grooves 44, respectively. The leaf springs 64 deflect in response to the payload 18 on the trailer 16. The stress or strain on the shackle pin 26 changes with the bending of the leaf springs 64. The strain gage bridge circuit 116 detect and react to deformations in the hysteresis grooves 44 when the leaf springs 64 are subjected to the weight of the load 18.

The strain gage pairs 116A, 116C and 116B, 116D are electrically coupled together and to the signal conditioner by signal wiring 120 that is color coded brown(+excitation), white(+signal),blue(−signal),black(−excitation)and grey(N/C). The strain gage bridge circuit 116 produces an output voltage signal that is directly proportional to the weight of the trailer load, typically providing an output level of about 0.6 millivolts per volt of excitation, yielding output signals in the range of 3.0–9.0 volts DC or A.C. in response to excitation in the range of 5–15 volts D.C. or A.C.

The shear forces experienced by the shackle pin 26 at each hysteresis groove 44 are sensed by the strain gages 116A, 116C and 116B, 116D generate load signals to the input of the signal conditioner 118, which in turn produces an output signal proportional to the total load borne by each wheel 22. The signal conditioner 118 outputs this signal to a data display unit 30 in the tractor cab 14 of the tractor trailer rig 12. The signal conditioner 118 could be an analog scaling circuit with an internal DC amplifier, noise filter and wave shaping features energized by an internal lithium battery power supply, or it could be a digital signal processor including an analog-to-digital converter with comparable features.

To install the strain gage bridge circuit 116 and signal conditioner 118 into the shackle pin 26, the main bore passage 114 is formed by drilling and machining the shackle pin 26 from the connector end 38 to the lubrication end 36. The strain gages of the bridge circuit 116 along with the signal wiring 120 are then positioned within the bore 114. After the strain gages have been bonded to the bore sidewall in alignment with the hysteresis grooves, the signal conditioner is inserted into the open annulus 52 of the connector end 38 for attachment to the cable connector 54. Preferably, the signal conditioner 118 is preassembled and electrically attached to the cable connector, and the combination is inserted and installed as a unit afer the bridge circuit wiring has been completed.

Once the strain gage bridge circuit 116, signal conditioner 118 and wiring 120 are installed, the bore 114 may be filled with potting material to protect the strain gages 116 and wiring 120 from environmental hazards such as chemicals, dirt and moisture. Typically, a protective gel, wax or polyurethane is applied directly to the strain gages to seal them from moisture, and polysulfide is injected into the main bore passage 114 through a fill port 122 to completely fill in the passage. Other suitable potting materials are well known to those skilled in the art and may be used as well. Finally, the shackle pin 26 is capped and sealed at the connector end 38 with the cable connector 54 that couples the signal conditioner to the cable 28. The fill port 122 is then capped at the zert lubrication end 36 with the plug 60.

Referring now to FIG. 5 and FIG. 7, a lubrication passage 122 extends substantially parallel to and radially offset from the longitudinal main bore 114. The lubrication passage 122 is isolated with respect to the longitudinal main bore 114. The lubrication passage 122 extends longitudinally between the lubrication end 36 and the grease port 48. A lubricant, preferably grease, is inserted under high pressure into the lubrication passage through the zert fitting 62, and is discharged into the grease reservoir annulus 46 through the grease port 48.

The lubrication passage 112 is formed by a centrally oriented 0.25 inch diameter longitudinal duct running parallel to the longitudinal bore 114 such that it conducts lubricant through the grease port 48 into the annular grease reservoir 46. In the preferred embodiment grease is the lubricant of choice, but dry or liquid lubricants may be substituted, depending on the load application conditions.

The radially offset lubricant passage 122 is formed by drilling a radially offset hole into the shackle pin 26 from the zert end 36 of the shackle pin 26 to the external grease groove 46 of the shackle pin 26. A zert fitting 62 is threaded into the hole on the zert end 36. A bore 48 perpendicular to the lubricant passage is drilled through the shackle pin from the external grease groove 46 to the lubricant passage 122. Lubricant is injected into the lubricant passage through a nipple N on the zert fitting 62.

For precision operation over extended service intervals, the bearings 108 must remain lubricated. The lubrication passage 122 and reservoir 112 provide lubricant storage of for the bearings 108. Lubricant is discharged through the grease port 48, fills the annular reservoir space 112 within the shackle bracket 78 and lubricates the bearings 108.

The radially offset lubricant passage 122 is isolated from the longitudinal bore 114 and the electronic components within the bore by the load pin body 124. Thus, the lubricant passage 122 provides a source of pressurized lubricant for the bearings 108 without damaging or interfering with the electronic components housed within the longitudinal bore 114.

Referring to FIG. 6 and FIG. 8 where an electrical schematic diagram illustrating the electrical interconnection of the components of the preferred embodiment of the invention is shown. The signal conditioner 118 can be either analog or digital. In the preferred embodiment, the signal conditioner 118 is digital.

The strain gage transducers 116A, 116B, 116 and 116D are preferably 350 ohm sensing transducers. The output of the strain gage bridge 116 is coupled to the signal conditioner 118 which preferably has a five pin connection and digital output of up to 16 bit wide measurement resolution. Preferably, a two-wire duplex cable type RS-485 is used. A typical digital signal conditioner 118 will have the following five electrical connections: brown (positive excitation), white (positive signal), blue (negative signal), black (negative excitation) and grey (no connection).

The connector 54 is a nickel plated brass, five pin female electrical connector for engaging a five pin male connector that interfaces with the five conductor connector cable 28.

Although the invention has been described with reference to certain exemplary arrangements, it is to be understood that the forms of the invention shown and described are to be treated as preferred embodiments. Various changes, substitutions and modifications can be realized without departing from the spirit and scope of the invention as defined by the appended claims.

We claim:

1. A load pin of the type including a load body intersected by a longitudinal bore, comprising in combination:

a sensing circuit disposed in the longitudinal bores the sensing circuit including a transducer for sensing a load condition, and the transducer having an output impedance that is proportional to the sensed load condition; and a signal conditioner disposed in the longitudinal bore and borer the signal conditioner having an input electrically coupled to the sensing circuit and signal conditioning circuit means for producing an electrical data signal that is related to the output impedance of the transducer, and output terminal means for conducting the electrical data signal to external monitoring apparatus.

2. A load pin as set forth in claim 1, wherein the load body is intersected by a lubricating passage that is radially offset and physically isolated from the longitudinal bore.

3. A load pin as set forth in claim 1, wherein the signal conditioner circuit means comprises a digital signal conditioning circuit.

4. A load pin as set forth in claim 1, wherein the signal conditioner circuit means comprises an analog signal conditioning circuit.

5. A load pin as set forth in claim 1, wherein the sensing circuit comprises a strain gage transducer.

6. A load pin as set forth in claim 1, wherein the sensing circuit comprises multiple strain gage transducers interconnected in a bridge circuit.

7. A load pin as set forth in claim 1, wherein the load body is intersected by at least one hysteresis groove disposed in proximate alignment with the sensing circuit.

8. A load pin as set forth in claim 1, wherein the sensing circuit comprises four strain gage transducers interconnected in a Whetstone bridge circuit.

9. A load pin as set forth in claim 1, wherein the sensing circuit comprises four strain gage transducers grouped in first and second sensing pairs that are longitudinally spaced from one another.

10. A load pin as set forth in claim 9, wherein the load body is intersected by first and second hysteresis grooves disposed in proximate alignment with the first and second sensing circuits, respectively.

11. A load pin as set forth in claim 1, including a cable connector mounted on the load body and electrically connected to the signal conditioner.

12. A load pin as set forth in claim 1, wherein the load body is intersected by a lubrication passage that is physically isolated from the longitudinal bore, and including a lubrication input fitting mounted on the load body and connected in communication with the lubrication passage.

13. A load pin comprising, in combination:
a load body having a connector end, a lubrication end and an external bearing surface disposed between the connector end and the lubrication end, the load body being intersected by a flint longitudinal bore, a second longitudinal bore that is offset with respect to the first longitudinal bore, and an annular lubrication groove formed in the bearing surface and connected in communication with the second longitudinal bore;
a sensing circuit enclosed within the longitudinal bore; and
a signal conditioner enclosed within the longitudinal bore and electrically coupled to the sensing circuit.

14. A load pin as set forth in claim 13, including a cable connector disposed in sealing engagement with the load pin on the connector end of the load body and electrically connected to the signal conditioner.

15. A load pin as set forth in claim 13, including a lubrication input fitting coupled to the second longitudinal bore on the lubrication end of the load body and connected in communication with the second longitudinal bore.

16. A load pin as set forth in claim 15, wherein the lubrication input fitting comprises a one-way check valve.

17. A load pin as set forth in claim 13, the load pin including a load body portion disposed between the first longitudinal bore and the second longitudinal bore, the load body portion shielding the first longitudinal bore from exposure to lubrication contained within the second longitudinal bore.

18. Apparatus for mechanically supporting and measuring the weight of a load on a vehicle comprising, in combination:
a bracket including a bearing member;
a shackle pin disposed in the bracket in engagement with the bearing member, the shackle pin including a load body having a connector end, a lubrication end and an external bearing surface disposed between the connector end and the lubrication end, the load body being intersected by a first longitudinal bore, a second longitudinal bore that is offset with respect to the first longitudinal bore, and a lubrication groove formed in the bearing surface and connected in communication with the second longitudinal bore;
a sensing circuit enclosed within the first longitudinal bore;
a signal conditioner enclosed within the first longitudinal bore and electrically coupled to the sensing circuit;
a cable connector mounted on the shackle pin on the connector end of the load body, the cable connector being electrically connected to the signal conditioner; and
a lubrication input fitting mounted on the shackle pin on the lubrication end of the load body, the lubrication input fitting being coupled in fluid communication with the second longitudinal bore.

19. A method for measuring a load imposed on a load pin of the type including a load body intersected by a main bore passage, comprising:
providing a load sensing circuit having transducer for sensing a load condition and having an output for conducting a load signal developed by the transducer in response to the load condition;
mounting the load sensing circuit internally within the main bore passage;
sensing a load imposed on the load pin with the internally mounted sensing circuit;
generating a load signal on the output of the sensing circuit in response to the load imposed on the pin;
providing a signal conditioning circuit having a signal input and a signal output;
mounting the signal conditioning circuit internally within the main bore passage; and
conditioning the load signal with the internally mounted signal conditioner.

20. A method for measuring a load imposed on a load pin as set forth in claim 19, wherein the load body is intersected by a lubrication passage that is physically separated from the main bore passage, including the steps:
sealing the main bore passage with respect to the lubrication passage; and
supplying lubricant into the lubrication passage.

21. A method for measuring a load imposed on a load pin of the type including a metallic body intersected by a main bore passage, comprising the steps:
sensing a load imposed on the load pin with a sensing circuit;
conditioning the load signal with a signal conditioner; and
shielding the sensing circuit and the signal conditioner with the metallic body of the load pin.

22. A method for measuring a load imposed on a load pin of the type including a metallic body, comprising the steps:
sensing a load imposed on the load pin with a sensing circuit;
conditioning the load signal with a signal conditioner; and
enclosing the sensing circuit and the signal conditioner within a passage formed in the metallic body.

23. A method for measuring a load imposed on a shackle pin of the type including a body portion engaged by roller bearings within a support bracket, comprising the steps:
sensing a load imposed on the shackle pin with a sensing circuit enclosed within a first longitudinal passage formed in the body portion;
conditioning the load signal with a signal conditioner enclosed within the first longitudinal passage;
supplying lubrication to the roller bearings through a second longitudinal passage formed in the load body; and
separating the first longitudinal passage from the second longitudinal passage with the body portion.

* * * * *